Jan. 13, 1925.
W. F. MILLIGAN
INSERT WRENCH
Filed June 5, 1924
1,522,968
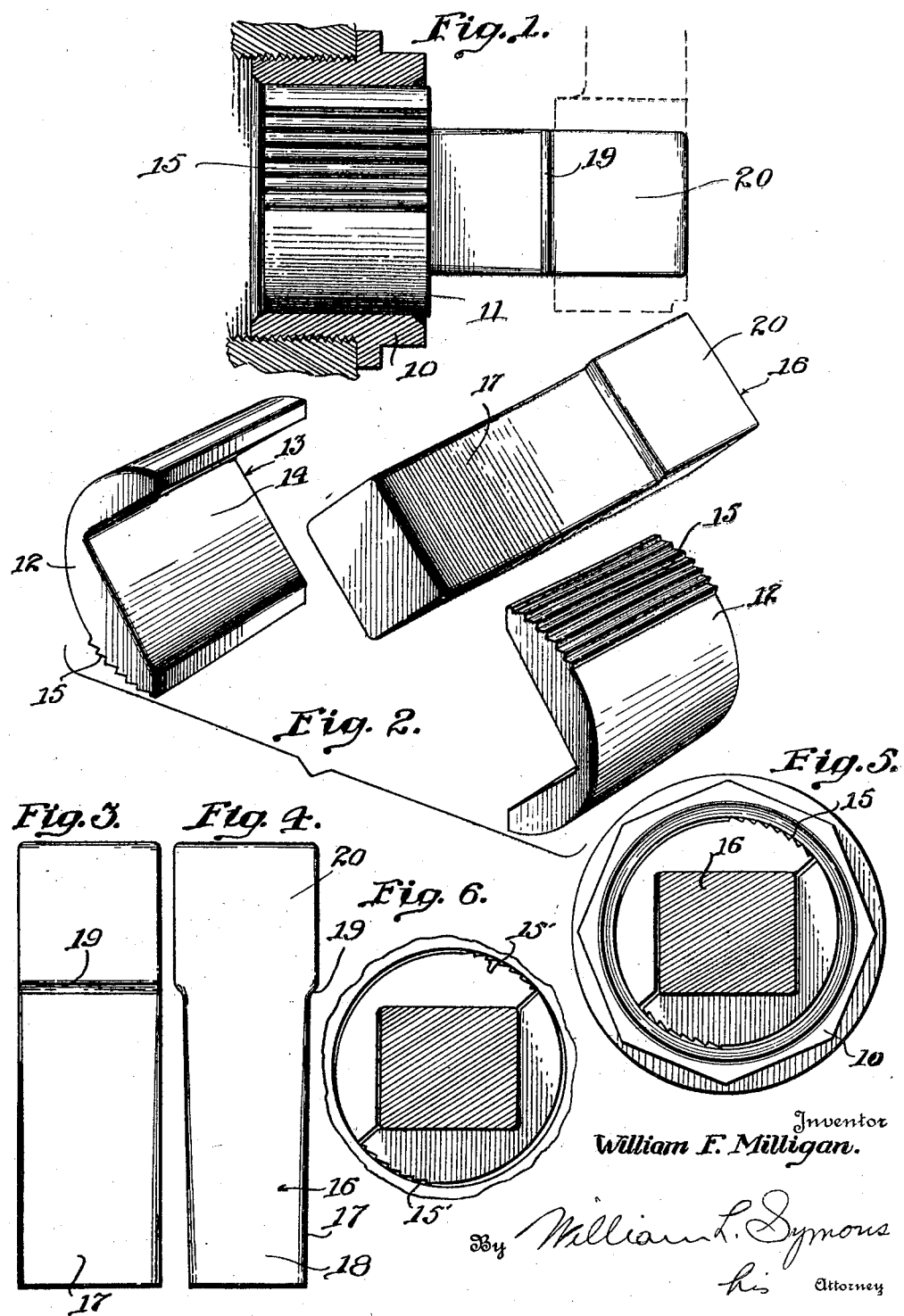
Inventor
William F. Milligan.

Patented Jan. 13, 1925.

1,522,968

UNITED STATES PATENT OFFICE.

WILLIAM F. MILLIGAN, OF CHICAGO, ILLINOIS.

INSERT WRENCH.

Application filed June 5, 1924. Serial No. 718,072.

*To all whom it may concern:*

Be it known that I, WILLIAM F. MILLIGAN, a citizen of the United States of America, residing at Chicago, in the county of Cook and State of Illinois, have invented certain new and useful Improvements in Insert Wrenches, of which the following is a specification.

My invention relates to improvements in devices for removing or inserting bushings and the like.

Bushings, pipe sleeves, valve seats and the like often become worn, and in removing them, the members into which they are screwed, are usually damaged and necessitate the replacement of very expensive parts when all that needs replacement is a very inexpensive article.

An important object of my invention is to provide a device which will easily remove bushings and the like which have become rusted or scaled into place, and which will operate in a very restricted space.

Another object of my invention is to provide a device of this character which will be formed of few and simple parts, and which will be strong and durable in use.

Other objects and advantages of my invention will be apparent during the course of the following description.

In the accompanying drawings which form a part of this specification, and wherein like characters of reference designate like or corresponding parts throughout the same:

Figure 1 is a sectional view through a valve seat or bushing having my improved device applied thereto, and shown in elevation;

Figure 2 is a perspective view of the several parts of the device;

Figure 3 is a side elevation of the plug;

Figure 4 is an end elevation of the same;

Figure 5 is a top elevation of the device, showing the plug in section; and

Figure 6 is a similar view of a modification.

In the drawings wherein for the purpose of illustration is shown a preferred embodiment of my invention, the numeral 10 designates the valve seat or bushing which is to be removed. This is illustrated as an air pump valve seat which is used on aeroplanes, but it is to be understood that it is merely illustrative of one application of my invention. In carrying out my invention, I provide the split sleeve 11 made up of the two semicircular sections 12 which are adapted to be arranged within the bushing or the like to be removed. This split sleeve has a rectangular, longitudinally arranged opening 13 in its center, half of which is in one section 12, and the other half in the other section. The sides 14 of the opening, representing the longer side of the rectangle, are slightly tapered, and the periphery of the sleeves adjacent these sides 14 is provided with teeth 15, which are arranged at diametrically opposite points.

The plug 16 is rectangular in cross section and of a size to snugly fit within the opening 13 of the split sleeve. The longer side 17 of the plug is tapered, and the shorter side 18 is not. Shoulders 19 are arranged adjacent one end of the plug and form a square head 20 at said end of the plug.

When the plug is inserted in the opening 13, the tapered sides 17 will bear against the tapered sides 14 of the opening, but the short sides 18 will not bear against the short side of the opening. When the plug is driven into the opening, the sleeve sections 12 will be expanded and will grip the interior of the bushing or the like to be extracted. It will be seen that the strain will be placed on the portions of the periphery of the sleeve provided with the teeth and not on the other portions, and these teeth will be made to firmly grip the bushing to be extracted. By having the plug and opening rectangular instead of square, or some other shape, the tapered sides 12 will always be adjacent the teeth, and there is no chance of getting the plug in the wrong position.

When the plug has been driven in, an ordinary open or box wrench is applied to the square head of the plug as shown in dotted lines in Figure 1 and by turning the wrench, the bushing will be readily removed without damage to any other parts and without danger of slipping.

In the modification shown in Figure 6, the teeth 15 are pitched in the reverse direction. This modification can be used to insert bushings and the like and the operation will be the same as described.

The sleeve sections are preferably made of tool steel and case hardened and the plug is preferably made of wrought steel neither case hardened nor temperate, so that the wrench will hold up under all conditions of use, and the teeth will not be injured by use.

While I have shown and described the preferred embodiment of my invention, it is to be understood that various changes in the shape, size and arrangement of parts may be resorted to without departing from the spirit of my invention or the scope of the subjoined claims.

Having described my invention what I claim and desire to protect by Letters Patent is:

1. A device of the character described comprising a split sleeve having an opening therein in the form of an irregular polygon, and a plug of corresponding configuration adapted to be inserted therein to expand the same certain only of the faces of said plug being tapered, said plug being capable of insertion in said opening only when in certain relative positions with respect thereto whereby the tapered faces of the plug will engage only certain faces of the opening.

2. A device of the character described comprising a split sleeve having an opening therein, adapted to receive a plug to expand said sleeve, teeth arranged upon a portion of the periphery of said sleeve, and means whereby pressure is exerted only upon the portion of the sleeve adjacent the teeth.

3. A device of the character described comprising a split sleeve having an opening therein, teeth arranged upon a portion only of the periphery of the sleeve, and a plug adapted to be inserted into said opening and exert pressure only on the portion of the sleeve adjacent the teeth.

4. A device of the character described, comprising a split sleeve having an opening therein, teeth arranged upon a portion of the periphery of said sleeve, a plug adapted to be inserted into said opening and exert pressure upon the portion of the sleeve having the teeth, and means whereby the plug will always be inserted in the opening so as to exert pressure upon the portion of the sleeve adjacent the teeth.

5. A device of the character described comprising a split sleeve having a rectangular opening therein, one pair of the sides of said opening being longer than the other, teeth arranged upon the periphery of the sleeve adjacent one of the sides of the opening, and a rectangular plug adapted to be inserted in the opening in the sleeve and having one of its sides tapered, said tapered side being adapted to engage the side of the opening adjacent the teeth.

6. A device of the character described comprising a split sleeve having a rectangular opening therein, one pair of the sides of said opening being longer than the other, teeth arranged upon the periphery of the sleeve adjacent one of the longer sides of the opening, and a rectangular plug adapted to be inserted in the opening in the sleeve, said plug having one of its pairs of sides longer than the other, one of said longer sides being tapered and adapted to engage one of the longer sides of the opening in the sleeve.

In testimony whereof I affix my signature.

WILLIAM F. MILLIGAN.